United States Patent [19]
Ryu

[11] Patent Number: 5,953,081
[45] Date of Patent: Sep. 14, 1999

[54] COMPLEMENTING CIRCUIT FOR TILT OF PICTURE IN A DISPLAY DEVICE

[75] Inventor: Jun-Young Ryu, Seoul, Rep. of Korea

[73] Assignee: SamSung Electronics Co., Ltd., Suwon, Rep. of Korea

[21] Appl. No.: 08/917,841

[22] Filed: Aug. 27, 1997

[30] Foreign Application Priority Data

Aug. 27, 1996 [KR] Rep. of Korea ............... 96-35856

[51] Int. Cl.$^6$ ............... H04N 9/29; H01J 29/06
[52] U.S. Cl. ............... 348/820; 348/806; 315/8; 315/370; 361/150
[58] Field of Search ............... 348/806, 805, 348/820, 807, 380; 315/8, 85, 370; 361/150; 313/413; H04N 9/29, 9/28, 3/22, 3/26

[56] References Cited

U.S. PATENT DOCUMENTS

| | | | |
|---|---|---|---|
| 5,777,698 | 7/1998 | Park | 348/809 |
| 5,825,131 | 10/1998 | Kim | 315/8 |
| 5,847,511 | 12/1998 | Lee | 315/8 |

*Primary Examiner*—Michael H. Lee
*Attorney, Agent, or Firm*—Robert E. Bushnell, Esq.

[57] ABSTRACT

A picture tilt complementing circuit in a display device includes: a microcomputer for receiving horizontal and vertical sync signals from a computer and generating a tilt control signal; a horizontal sawtooth wave generation unit for converting the tilt control signal transmitted from the microcomputer into a sawtooth wave signal according to a horizontal fly back signal; a vertical sawtooth wave generation unit for converting the tilt control signal transmitted from the microcomputer into a sawtooth wave signal according to a vertical fly back signal; a vertical center control unit for synthesizing a horizontal sawtooth wave signal generated by the horizontal sawtooth wave generation unit with a vertical position control signal transmitted from the microcomputer and sending the synthesized result to a vertical output unit; and a horizontal position control unit for synthesizing a vertical sawtooth wave signal generated by the vertical sawtooth wave generation unit with a horizontal position control signal transmitted from the microcomputer and sending the synthesized result to a horizontal oscillation unit.

14 Claims, 5 Drawing Sheets

Fig. 6

COMPLEMENTING CIRCUIT FOR TILT OF PICTURE IN A DISPLAY DEVICE

CLAIM OF PRIORITY

This application makes reference to, incorporates the same herein, and claims all benefits accruing under 35 U.S.C §119 from an application entitled *Complementing Circuit For Tilt Of Picture In Display Device* earlier filed in the Korean Industrial Property Office on Aug. 27, 1996, and there duly assigned Serial No. 96-35856 by that Office.

BACKGROUND OF THE INVENTION

1. Field of the Invention

The present invention relates to a picture tilt complement circuit for complementing for a tilt of a picture displayed on a screen in a display device, such as a monitor or television receiver, using the Braun tube, such as a color picture tube (CPT) or cathode ray tube (CRT), as an image display.

2. Discussion of Related Art

Usually, a display device, such as a CRT, forms an image using an electron beam focussed on a fluorescent screen. A circuit changing the direction of the electron beam is called a deflecting circuit. There are two kinds of deflecting methods in a deflecting circuit: an electrostatic deflection using electric field; and an electromagnetic deflection using magnetic field. In a television using the electromagnetic deflection, image is formed by applying current of a sawtooth waveform to horizontal and vertical coils.

As one of the display devices which convert signals transmitted from a computer into image to display for a user, a monitor is a representative peripheral device in the computer. The basic configuration of the inner circuit in the monitor will consists of a video card installed inside a computer for providing color signals (R, G, B) and horizontal and vertical sync signals (H_Sync and V_Sync) necessary for forming an image, a microcomputer for generating a control signal to control an image in a monitor after receiving the horizontal and vertical sync signals from video card, horizontal and vertical deflecting circuits for receiving the horizontal and vertical sync signals and sequentially deflecting an electron beam formed in an electron gun in the CRT from top to bottom and from left to right using a deflection yoke so as to form a picture like a photograph, a high voltage circuit for supplying high voltage to an anode in the CRT using a retrace pulse produced from an output port of the horizontal deflecting circuit based on the principle of a switching circuit and technology relating to high voltage, a video pre-amplifier for maintaining a specified level of voltage after amplifying the low video signals transmitted from the video card using a low voltage amplifier, and video main amplifier for supplying energy to each pixel displayed on the CRT after re-amplifying the video signals amplified by video pre-amplifier.

The electron gun forms an electron beam according to the video signals. The deflection circuit horizontally and vertically deflects the electron beam and scans it on the fluorescent screen in front, thus representing a specified picture. The electron beam is deflected using magnetic field. The horizontal and vertical deflecting coils installed in a funnel portion in the Braun tube generate horizontal and vertical deflection magnetic fields, respectively, and deflect the electron beam.

The earth has its proper magnetic field called as an earth magnetic field. This earth magnetic field influences deflection of electron beam by the horizontal and vertical deflecting coils, thus the picture is displayed on the screen in a monitor on the tilt to left or right, not horizontally.

Horizontal and vertical deflecting coils are utilized to complement for the tilt of the picture displayed through a Braun tube in prior art by creating a complementing magnetic field. This complementing magnetic field moves the tilt of the picture on the screen counterclockwise, and the degree of tilt complement is variable.

As described above, the tilt of the picture on a screen is complemented in such a manner to of varying a complementing magnetic field by controlling the direction and the amount of current across a complementing coil. However, the magnetic field created by the complementing coil often has a bad impact on the quality of picture. A Braun tube is usually much influenced by an ambient magnetic field. Because of the ambient magnetic field, an electron beam, which is scanned on a screen, drifts, thus convergence is varied as well as there occurs blur on the screen. Much current must be applied to the complementing coil to make the complementing coil create a complementing magnetic field, thereby consuming much electric power and generating much heat causing reduction of life of parts. Additionally, the prior art involves a problem that a special complement coil is required.

SUMMARY OF THE INVENTION

Accordingly, the present invention is directed to a picture tilt complementing circuit that substantially obviates one or more of the limitations and disadvantages of the related art.

An object of the present invention is to provide a picture tilt complementing circuit which controls amplitudes and phases of horizontal and vertical sawtooth waves according to tilt control signals generated by a microcomputer using horizontal and vertical parallelograms, and synthesizes these waves with horizontal and vertical position control signals, before sending them as control signals of horizontal and vertical position control units, thereby simultaneously controlling the horizontal and vertical parallelograms to complement for a tilt of a picture on a screen.

To achieve these and other advantages, and in accordance with the purpose of the present invention as embodied and broadly described, a picture tilt complementing circuit in a display device, utilizes: a microcomputer for receiving horizontal and vertical sync signals from a computer and generating a tilt control signal; a horizontal sawtooth wave generation unit for converting the tilt control signal transmitted from the microcomputer into a sawtooth wave signal according to a horizontal fly back signal; a vertical sawtooth wave generation unit for converting the tilt control signal transmitted from the microcomputer into a sawtooth wave signal according to a vertical fly back signal; a vertical center control unit for synthesizing a horizontal sawtooth wave signal generated by the horizontal sawtooth wave generation unit with a vertical position control signal transmitted from the microcomputer, and sending the synthesized result to a vertical output unit; and a horizontal position control unit for synthesizing a vertical sawtooth wave signal generated by the vertical sawtooth wave generation unit with a horizontal position control signal transmitted from the microcomputer, and sending the synthesized result to a horizontal oscillation unit.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention, examples of which are illustrated in the accompanying drawings.

Figure 1:
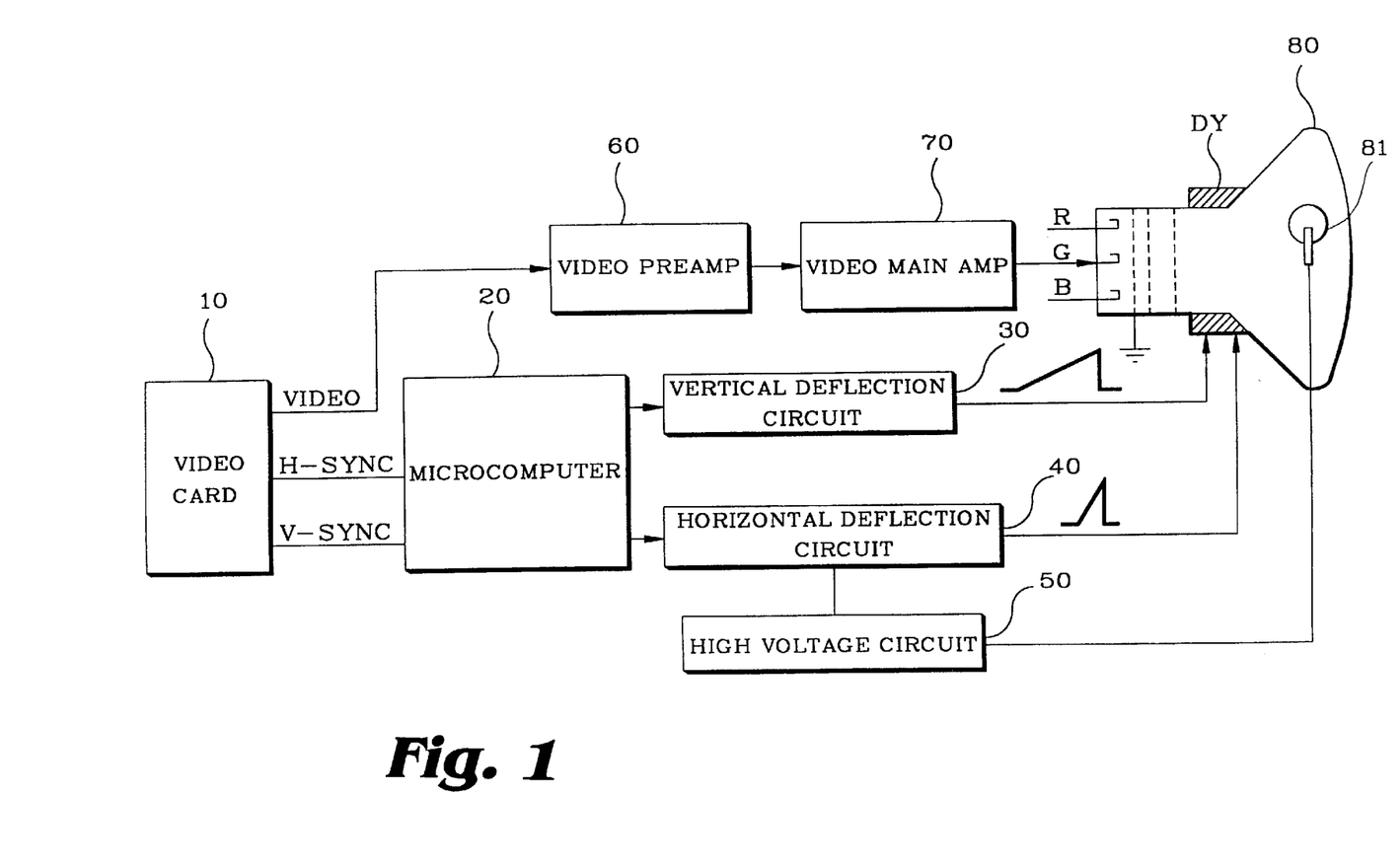
FIG. 1 is a block diagram of the configuration of a usual display device.

An example of the basic configuration of the inner circuit in a monitor will be simply described with reference to FIG. 1.

The display device consists of: video card 10 installed inside a computer (not shown in the drawing), for providing color signals (R, G, B) and horizontal and vertical sync signals (H_Sync and V_Sync) necessary for forming an image; a microcomputer 20 for generating a control signal to control an image in a monitor after receiving the horizontal and vertical sync signals from video card 10; horizontal and vertical deflecting circuits, 40 and 30, for receiving the horizontal and vertical sync signals (H_Sync and V_Sync) and sequentially deflecting an electron beam formed in an electron gun in CRT 80 from top to bottom and from left to right in CRT 80 using a deflection yoke (DY) so as to form a picture; a high voltage circuit 50 for supplying high voltage to an anode in CRT 80 using a retrace pulse produced from an output port of horizontal deflecting circuit 40 based on the principle of a switching circuit and technology relating to high voltage; a video pre-amplifier 60 for maintaining a specified level of voltage after amplifying the low video signals transmitted from video card 10 using a low voltage amplifier; and a video main amplifier 70 for supplying energy to each pixel in CRT 80 after re-amplifying the video signals amplified by video pre-amplifier 60 to generate signals of $40V_{pp}$ through $60V_{pp}$.

Figure 2:
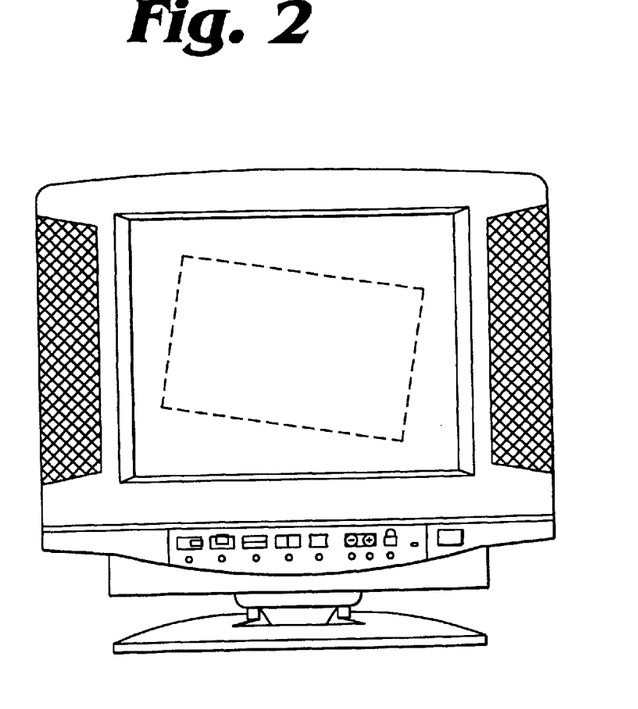
FIG. 2 illustrates a picture tilted by influence of a magnetic field.
Figure 3:
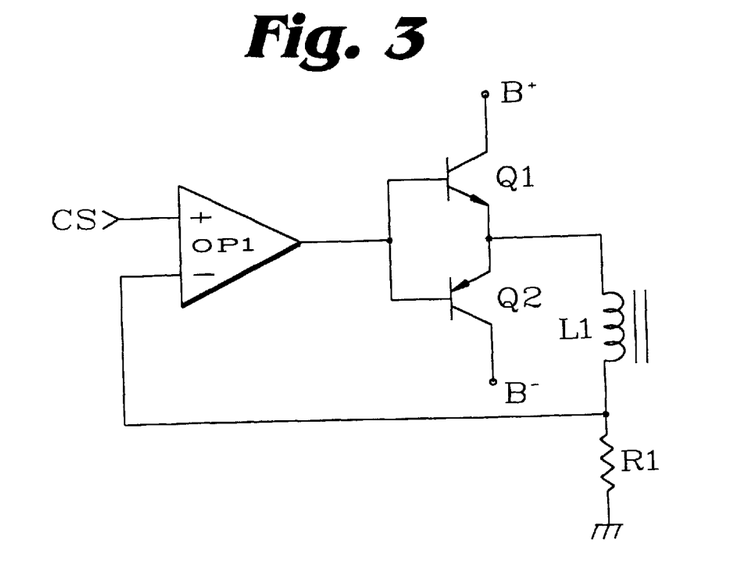
FIG. 3 is a diagram of a tilt complementing circuit according to prior art.

Horizontal and vertical deflecting coils are utilized to complement for the tilt, illustrated in FIG. 2, of the picture displayed through a Braun tube, and FIG. 3 illustrates an exemplary tilt complementing circuit.

A control unit such as a microcomputer 20 is connected to the non-inverted input terminal (+) in operational amplifier OP1, thus a tilt control signal CS, generated by the control unit is applied to operational amplifier OP1. The output terminal of operational amplifier OP1 is connected to the respective bases of transistors Q1 and Q2, thus electric powers sources B+ and B− are applied to the respective collectors of transistors Q1 and Q2. The emitters of transistors Q1 and Q2, are connected to a ground resistor R1 through a complementing coil L1 installed in the funnel portion in the Braun tube, and the node between complementing coil L1 and ground resistor R1 is connected to the inverted terminal (−) of operational amplifier OP1.

In the exemplary tilt complementing circuit having such the configuration, when the control signal CS is input to operational amplifier OP1 as a positive voltage after the electric powers B+ and B− were applied, operational amplifier OP1 produces a positive signal, then transistor Q1 is turned on. While the electric power B+ is grounded through transistor Q1 complementing coil L1 and ground resistor R1, complementing coil L1 creates a complementing magnetic field. This complementing magnetic field moves the tilt of the picture on the screen clockwise.

When the control signal CS is input to operational amplifier OP1 as a negative voltage, operational amplifier OP1 produces a negative signal, then transistor Q2 is turned on. A ground voltage sequentially passes through ground resistor R1, complementing coil L1 and transistor Q1, and thus flows to power supply B−. The complementing coil L1 creates a complementing magnetic field opposite to the above one. This complementing magnetic field moves the tilt of the picture on the screen counterclockwise. The degree of tilt complement varies, depending upon the level of control signal CS.

Figure 4:
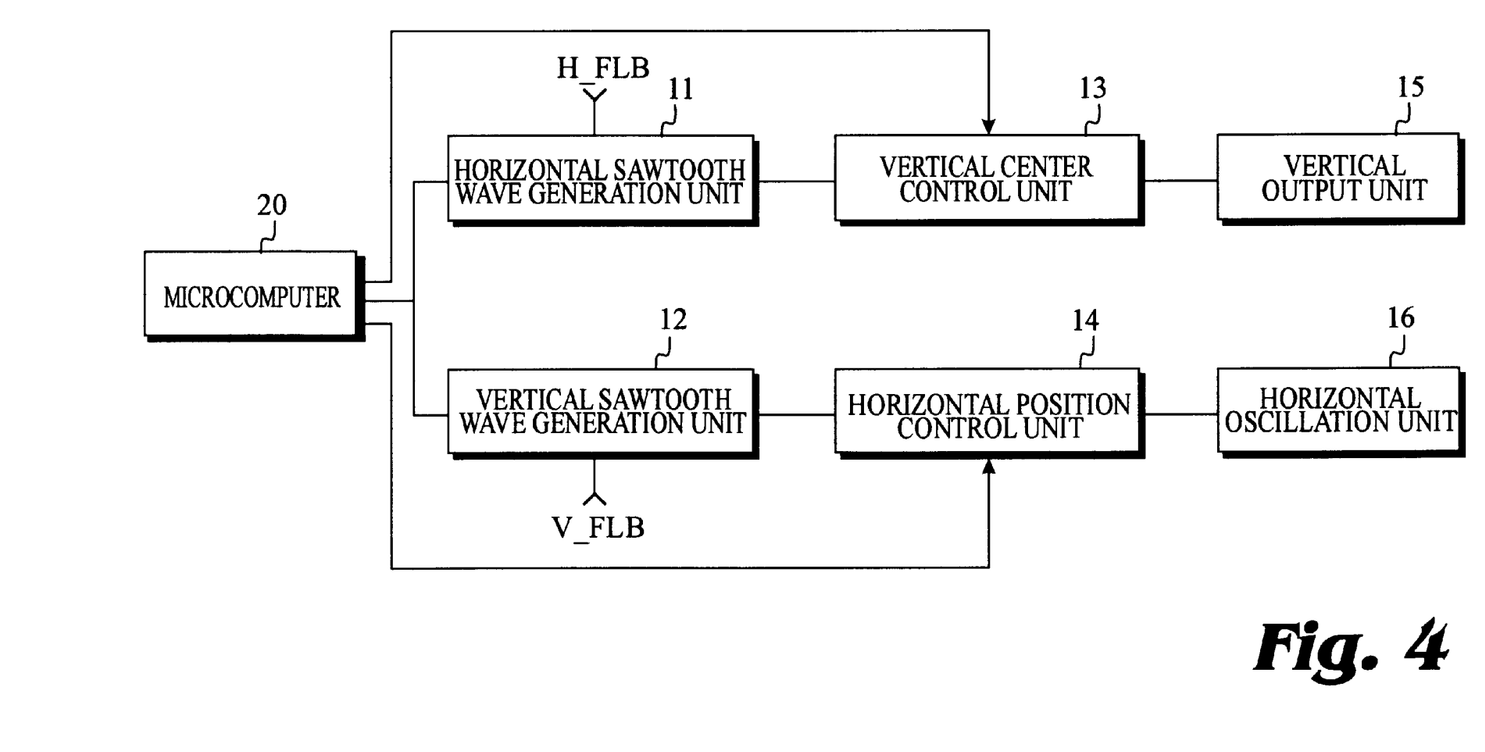
FIG. 4 is a block diagram of a tilt complementing circuit according to the present invention.
Figure 5:
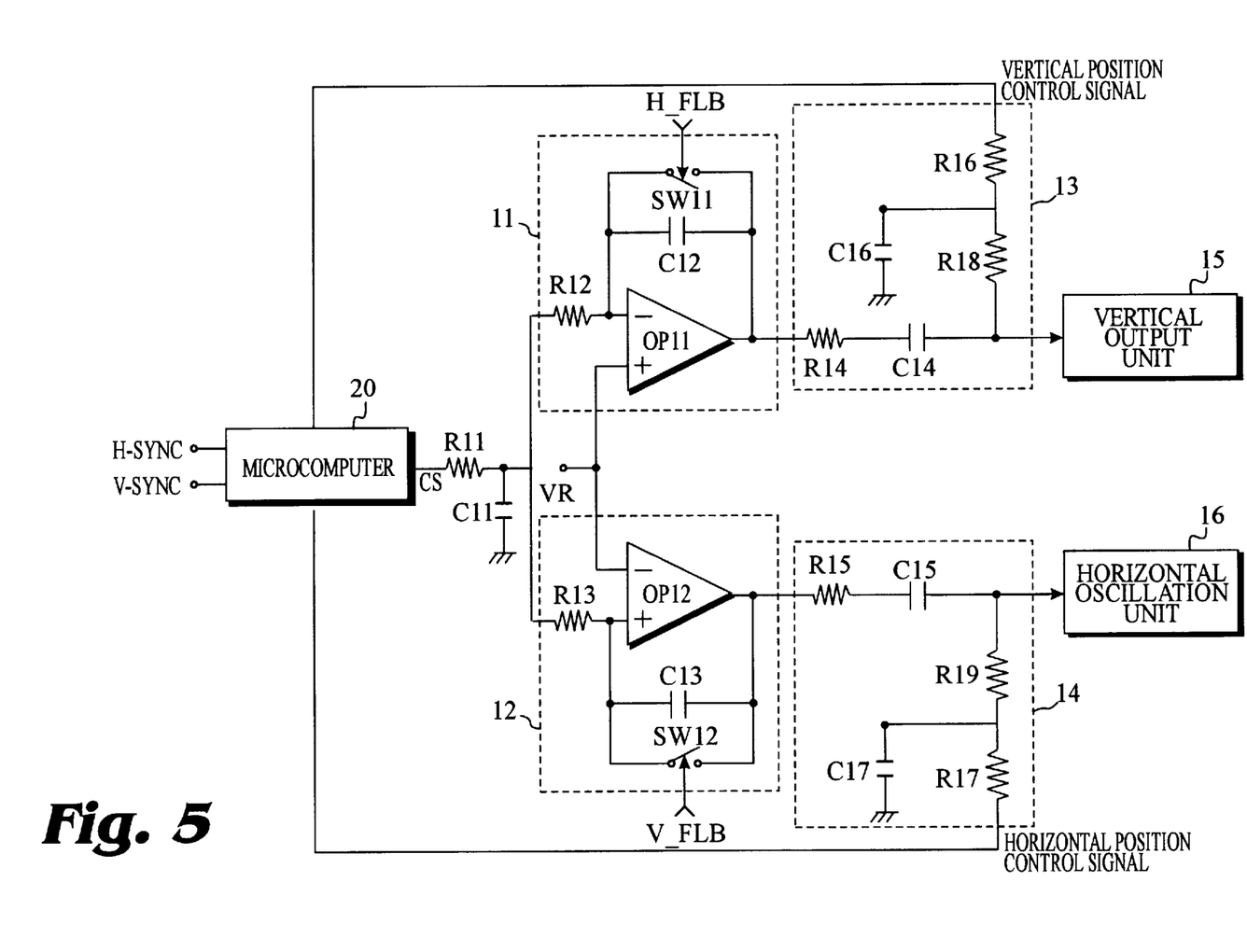
FIG. 5 is a detailed circuit diagram of FIG. 4.

With reference to FIGS. 4 and 5, a tilt complementing circuit of the present invention is described below in detail.

As shown in FIG. 4, a tilt complementing circuit of the present invention comprises: a microcomputer 20 for receiving horizontal and vertical sync signals from a computer (not shown in the drawing), and for producing a tilt control signal and horizontal and vertical position control signals in response to user manipulation of a known tilt control button, or buttons, (not shown) located on a monitor; a horizontal sawtooth wave generation unit 11 for receiving the tilt control signal from microcomputer 20 and producing a sawtooth wave signal according to a horizontal fly back signal H_FLB; a vertical sawtooth wave generation unit 12 for receiving the tilt control signal from microcomputer 20 and generating a sawtooth wave signal according to a vertical fly back signal V_FLB; a vertical center control unit 13 for synthesizing the horizontal sawtooth wave signal generated by horizontal sawtooth wave generation unit 11 with the vertical position control signal transmitted from microcomputer 20, before sending it to a vertical output unit 15; and a horizontal position control unit 14 for synthesizing the vertical sawtooth wave signal generated by vertical sawtooth wave generation unit 11 with the horizontal position control signal transmitted from microcomputer 20, before sending it to a horizontal oscillation unit 16.

As shown in FIG. 5, microcomputer 20 which received horizontal and vertical sync signals, H_Sync and V_Sync, produces a tilt control signal, CS, using a D/A converter (not shown in the drawing) which converts a digital signal into an analog signal.

Horizontal sawtooth generation unit 11 utilizes a resistor R12 for receiving control signal CS from microcomputer 20; a switch SW11 for switching according to horizontal fly back signal H_FLB; a capacitor C12 which is connected to switch SW11 in parallel; and an operational amplifier OP11 for receiving control signal CS transmitted through resistor R12 through its inverted terminal and for receiving a reference voltage VR through its non-inverted terminal, and for performing an operation-amplification with them.

Vertical sawtooth generation unit 12 utilizes a resistor R13 for receiving control signal CS from microcomputer 20; a switch SW12 for switching according to vertical fly back signal V_FLB; a capacitor C13 which is connected to switch SW12 in parallel; and an operational amplifier OP12 for receiving control signal CS transmitted through resistor R13 through its non-inverted terminal and reference voltage VR through its inverted terminal, and performing operation-amplification with them.

Vertical center control unit 13 utilizes resistors R16 and R18 and capacitor C16 for transmitting the vertical position control signal input by microcomputer 20; and a resistor R14 and a capacitor C14 for receiving an output signal from operational amplifier OP11.

Horizontal position control unit 14 utilizes resistors R17 and R19 and capacitor C17 for transmitting horizontal position control signal input by microcomputer 20; and a resistor R15 and a capacitor C15 for receiving an output signal from operational amplifier OP12.

Capacitor C11 is charged with tilt control signal CS provided by microcomputer 20 through resistor R11, thus tilt control signal CS is stabilized in the tilt complementing circuit having the above configuration according to the present invention. Tilt control signal CS stabilized by capacitor C11 is applied to the inverted input terminal (−) of operational amplifier OP11 via resistor R12. Operational amplifier OP11 integrates tilt control signal CS based on the difference between the tilt control signal CS and reference voltage VR and time constants of resistor R12 and capacitor C12. At this time if horizontal fly back signal H_FLB is input, switch SW11 is closed, thus charge potential in capacitor C12 is discharged decreasing the output level of operational amplifier OP11 and producing a sawtooth wave signal. The sawtooth wave signal generated by horizontal sawtooth wave generation unit 11 after passing through resistor R14 and capacitor C14 in vertical center control unit 13 is synthesized with a vertical position control signal transmitted from microcomputer 20 sequentially passing through resistor R16 ground capacitor C16 and resistor R18. Vertical output unit 15 controls a vertical position and a vertical tilt of a picture according to the vertical position control signal and the level of the sawtooth wave signal generated by sawtooth wave generation unit 11.

Tilt control signal CS stabilized by capacitor C11 is applied to the non-inverted input terminal (+) of operational amplifier OP12 via resistor R13 in vertical sawtooth wave generation unit 12. Operational amplifier OP12 integrates tilt control signal CS according to the time constants of resistor R13 and capacitor C13. If vertical fly back signal V_FLB is then input, switch SW12 is closed, thus charge potential in capacitor C13 is discharged decreasing the output level of operational amplifier OP13 and producing a sawtooth wave signal. The sawtooth wave signal generated by vertical sawtooth wave generation unit 12, after passing through resistor R15 and capacitor C15 in horizontal position control unit 14, is synthesized with a horizontal position control signal transmitted from microcomputer 20 sequentially passing through resistor R17 ground capacitor C17 and resistor R19. Horizontal oscillation unit 16 controls a horizontal position of a picture according to the horizontal position control signal using a horizontal drive circuit and horizontal output circuit (not shown in the drawing) and also controls a horizontal tilt according to the level of the sawtooth wave signal generated by vertical sawtooth wave generation unit 12.

Figure 6:
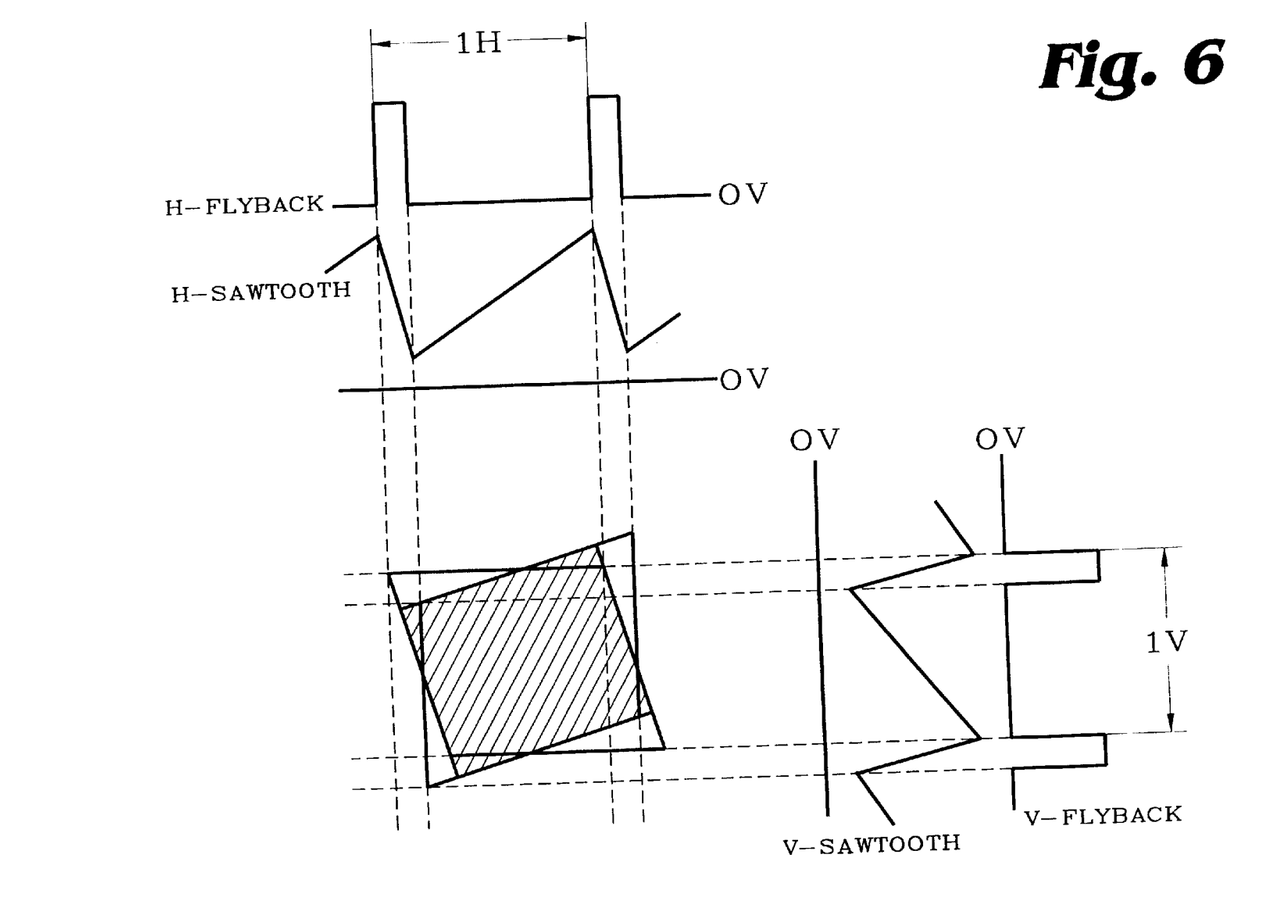
FIG. 6 illustrates waveforms of each units shown in FIG. 5.

As shown in FIG. 6, the tilt of the picture can be controlled by controlling the tilts of the horizontal or vertical sawtooth waves. Essentially horizontal and vertical parallelograms are simultaneously controlled by synthesizing the horizontal and vertical sawtooth waves, after controlling their amplitudes and phases, with vertical and horizontal position control signals, respectively, before sending them to the vertical output unit and the horizontal oscillation unit thereby changing the tilt of the picture.

As illustrated this invention complements horizontal and vertical tilts of a picture without using a special tilt complementing coil thereby removing a mechanical limit caused by installing a tilt complementing coil. This invention also has other effects. Tilt can be easily complemented and power consumption can be decreased because of using low electric power in this invention. The quality of a picture is also increased thereby improving reliability of products.

It will be apparent to those skilled in the art that various modifications and variations can be made in a picture tilt complementing circuit in a display device of the present invention without deviating from the spirit or scope of the invention. Thus it is intended that the present invention cover the modifications and variations of this invention provided they come within the scope of the appended claims and their equivalents.

What is claimed is:

1. A picture tilt complementing circuit in a display device, the circuit comprising:
   a microcomputer for receiving horizontal and vertical sync signals from a computer and generating a tilt control signal;
   a horizontal sawtooth wave generation unit for converting said tilt control signal into a horizontal sawtooth wave signal in response to a horizontal fly back signal;
   a vertical sawtooth wave generation unit for converting said tilt control signal into a vertical sawtooth wave signal in response to a vertical fly back signal;
   a vertical center control unit for synthesizing said horizontal sawtooth wave signal generated by said horizontal sawtooth wave generation unit with a vertical position control signal transmitted from said microcomputer and sending the synthesized result to a vertical output unit; and
   a horizontal position control unit for synthesizing said vertical sawtooth wave signal generated by said vertical sawtooth wave generation unit with a horizontal position control signal transmitted from said microcomputer and sending the synthesized result to a horizontal oscillation unit.

2. The circuit as set forth in claim 1, wherein said horizontal sawtooth wave generation unit comprises an integrator for integrating said tilt control signal and a switch for discharging an output signal of said integrator according to said horizontal fly back signal.

3. The circuit as set forth in claim 1, wherein said vertical sawtooth wave generation unit comprises an integrator for integrating said tilt control signal and a switch for discharging an output signal of said integrator according to said vertical fly back signal.

4. The circuit as set forth in claim 1, further comprising:
   a first resistor having a first end connected to an output terminal of said microcomputer for receiving said tilt control signal and a second end connected to an input terminal of said horizontal sawtooth wave generation unit;

said second end of said first resistor being connected to an input terminal of said vertical sawtooth wave generation unit; and a first capacitor connected between a ground terminal and said second end of said first resistor.

5. The circuit as set forth in claim 4, wherein said horizontal sawtooth wave generation unit comprises:

an operational amplifier having a non-inverting input terminal connected to a reference voltage;

a second resistor connected between said second end of said first resistor and an inverting input terminal of said operational amplifier;

a second capacitor connected between said inverting input terminal of said operational amplifier and an output terminal of said operational amplifier; and a switch having one terminal connected to said inverting input terminal of said operational amplifier and a second terminal connected to said output terminal of said operational amplifier, said switch be controlled by said horizontal fly back signal.

6. The circuit as set forth in claim 4, wherein said vertical sawtooth wave generation unit comprises:

an operational amplifier having an inverting input terminal connected to a reference voltage;

a second resistor connected between said second end of said first resistor and a non-inverting input terminal of said operational amplifier;

a second capacitor connected between said non-inverting input terminal of said operational amplifier and an output terminal of said operational amplifier; and a switch having one terminal connected to said non-inverting input terminal of said operational amplifier and a second terminal connected to said output terminal of said operational amplifier, said switch be controlled by said vertical fly back signal.

7. The circuit as set forth in claim 5, wherein said vertical center control unit comprises:

a first input terminal connected to said output terminal of said operational amplifier;

an output terminal connected to an input terminal of said vertical output unit;

a third resistor and a third capacitor connected in series between said first input terminal of said vertical center control unit and said output terminal of said vertical center control unit;

a second input terminal for receiving said vertical position control signal, said second input terminal being connected to said output terminal of said vertical center control unit via a fourth resistor and a fifth resistor connected in series between said second input terminal of said vertical center control unit and said output terminal of said vertical center control unit; and a fourth capacitor connected between said ground terminal and a node commonly connecting said fourth resistor to said fifth resistor.

8. The circuit as set forth in claim 6, wherein said horizontal position control unit comprises:

a first input terminal connected to said output terminal of said operational amplifier;

an output terminal connected to an input terminal of said horizontal oscillation unit;

a third resistor and a third capacitor connected in series between said first input terminal of said horizontal position control unit and said output terminal of said horizontal position control unit;

a second input terminal for receiving said horizontal position control signal, said second input terminal being connected to said output terminal of said horizontal position control unit via a fourth resistor and a fifth resistor connected in series between said second input terminal of said horizontal position control unit and said output terminal of said horizontal position control unit; and a fourth capacitor connected between said ground terminal and a node commonly connecting said fourth resistor to said fifth resistor.

9. A picture tilt complementing circuit in a display device, said picture tilt complementing circuit comprising:

a microcomputer for generating a tilt control signal in response to received horizontal and vertical sync signals output from a computer;

a horizontal sawtooth wave generation unit for converting said tilt control signal into a horizontal sawtooth wave signal in response to a horizontal fly back signal;

a vertical sawtooth wave generation unit for converting said tilt control signal into a vertical sawtooth wave signal in response to a vertical fly back signal;

a vertical center control unit for combining said horizontal sawtooth wave signal generated by said horizontal sawtooth wave generation unit with a vertical position control signal transmitted from said microcomputer and sending the combined result to a vertical output unit;

said vertical output unit for controlling a vertical position and a vertical tilt of a picture according to said vertical position control signal and a level of said horizontal sawtooth wave signal;

a horizontal position control unit for combining said vertical sawtooth wave signal generated by said vertical sawtooth wave generation unit with a horizontal position control signal transmitted from said microcomputer and sending the combined result to a horizontal oscillation unit; and said horizontal oscillation unit for controlling a horizontal position and a horizontal tilt according to said horizontal position control signal and a level of said vertical sawtooth wave signal.

10. The circuit as set forth in claim 9, further comprising:

a first resistor having a first end connected to an output terminal of said microcomputer for receiving said tilt control signal and a second end connected to an input terminal of said horizontal sawtooth wave generation unit;

said second end of said first resistor being connected to an input terminal of said vertical sawtooth wave generation unit; and a first capacitor connected between a ground terminal and said second end of said first resistor.

11. The circuit as set forth in claim 10, wherein said horizontal sawtooth wave generation unit comprises:

an operational amplifier having a non-inverting input terminal connected to a reference voltage;

a second resistor connected between said second end of said first resistor and an inverting input terminal of said operational amplifier;

a second capacitor connected between said inverting input terminal of said operational amplifier and an output terminal of said operational amplifier; and a switch having one terminal connected to said inverting input terminal of said operational amplifier and a second terminal connected to said output terminal of said operational amplifier, said switch be controlled by said horizontal fly back signal.

12. The circuit as set forth in claim 11, wherein said vertical center control unit comprises:

a first input terminal connected to said output terminal of said operational amplifier;

an output terminal connected to an input terminal of said vertical output unit;

a third resistor and a third capacitor connected in series between said first input terminal of said vertical center control unit and said output terminal of said vertical center control unit;

a second input terminal for receiving said vertical position control signal, said second input terminal being connected to said output terminal of said vertical center control unit via a fourth resistor and a fifth resistor connected in series between said second input terminal of said vertical center control unit and said output terminal of said vertical center control unit; and a fourth capacitor connected between said ground terminal and a node commonly connecting said fourth resistor to said fifth resistor.

13. The circuit as set forth in claim 10, wherein said vertical sawtooth wave generation unit comprises:

an operational amplifier having an inverting input terminal connected to a reference voltage;

a second resistor connected between said second end of said first resistor and a non-inverting input terminal of said operational amplifier;

a second capacitor connected between said non-inverting input terminal of said operational amplifier and an output terminal of said operational amplifier; and a switch having one terminal connected to said non-inverting input terminal of said operational amplifier and a second terminal connected to said output terminal of said operational amplifier, said switch be controlled by said vertical fly back signal.

14. The circuit as set forth in claim 13, wherein said horizontal position control unit comprises:

a first input terminal connected to said output terminal of said operational amplifier;

an output terminal connected to an input terminal of said horizontal oscillation unit;

a third resistor and a third capacitor connected in series between said first input terminal of said horizontal position control unit and said output terminal of said horizontal position control unit;

a second input terminal for receiving said horizontal position control signal, said second input terminal being connected to said output terminal of said horizontal position control unit via a fourth resistor and a fifth resistor connected in series between said second input terminal of said horizontal position control unit and said output terminal of said horizontal position control unit; and a fourth capacitor connected between said ground terminal and a node commonly connecting said fourth resistor to said fifth resistor.

* * * * *